United States Patent
Kim

(10) Patent No.: US 8,599,153 B2
(45) Date of Patent: Dec. 3, 2013

(54) APPARATUS AND METHOD FOR EXECUTING HOT KEY FUNCTION OF MOBILE TERMINAL

(75) Inventor: Yong-sik Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 330 days.

(21) Appl. No.: 12/850,869

(22) Filed: Aug. 5, 2010

(65) Prior Publication Data

US 2011/0043469 A1  Feb. 24, 2011

(30) Foreign Application Priority Data

Aug. 24, 2009  (KR) .................. 10-2009-0078193

(51) Int. Cl.
G06F 3/041 (2006.01)
G06F 3/033 (2013.01)
H04M 1/00 (2006.01)

(52) U.S. Cl.
USPC ................ 345/173; 345/158; 455/550.1

(58) Field of Classification Search
USPC ................ 345/173, 158; 455/550.1
See application file for complete search history.

(56) References Cited

U.S. PATENT DOCUMENTS

| 7,133,859 B1 * | 11/2006 | Wong .................................... 1/1 |
| 2004/0024604 A1 * | 2/2004 | Wen et al. ..................... 704/277 |
| 2005/0225533 A1 * | 10/2005 | Cheng .......................... 345/163 |
| 2007/0018964 A1 | 1/2007 | Moon et al. |
| 2008/0030360 A1 | 2/2008 | Griffin |
| 2008/0168087 A1 * | 7/2008 | Repetti et al. ............. 707/103 R |
| 2008/0246778 A1 | 10/2008 | Ham et al. |
| 2010/0041431 A1 * | 2/2010 | Kim et al. .................. 455/550.1 |

FOREIGN PATENT DOCUMENTS

| JP | 09-261299 | 10/1997 |
| JP | 2002-330210 | 11/2002 |
| KR | 10-2003-0073139 | 9/2003 |
| KR | 10-2004-0037982 | 5/2004 |
| KR | 1020050059661 | 6/2005 |
| KR | 10-2006-0079403 | 7/2006 |
| KR | 10-2008-0059743 | 7/2008 |
| KR | 10-2008-0085983 | 9/2008 |
| KR | 1020080089927 | 10/2008 |
| KR | 1020090007128 | 1/2009 |
| WO | 01/56256 | 8/2001 |
| WO | 2006/036069 | 4/2006 |

OTHER PUBLICATIONS

The State Intellectual Property Office of Chine, First Notification of Office Action dated May 9, 2012 for CN Patent Application No. 201010262676.X.
Extended European Search Report for EP Application No. 10 17 0234, dated Apr. 22, 2013.

* cited by examiner

*Primary Examiner* — Ariel Balaoing
(74) *Attorney, Agent, or Firm* — H.C. Park & Associates, PLC

(57) ABSTRACT

An apparatus and a method for executing a hot key function of a mobile terminal provide that, if a motion of the mobile terminal is detected and a touch of a user is detected, a specific hot key function is executed, so that the user may input commands according to the touch of the user and the motion of the mobile terminal.

23 Claims, 9 Drawing Sheets

FIG.9

WOMAN GENERATION – SEE YA, DAVICHI, T-ARA

MY MAN – DAVICHI

CAUSE ACCIDENT - DAVICHI

8282- DAVICHI

APPARATUS AND METHOD FOR EXECUTING HOT KEY FUNCTION OF MOBILE TERMINAL

CROSS REFERENCE TO RELATED APPLICATION

This application claims priority from and the benefit under 35 U.S.C. §119(a) of Korean Patent Application No. 10-2009-0078193, filed on Aug. 24, 2009, the entire disclosure of which is incorporated herein by reference for all purposes.

BACKGROUND

1. Field

The following description relates to control technology of a mobile terminal.

2. Discussion of the Background

Recently, mobile terminals using touch screens as user interfaces have become widespread. However, if the touch screen of the mobile terminal has a limited screen size, the user may be required to perform complicated manipulations to execute various functions of the mobile terminal.

In this regard, intuitive user interfaces capable of executing various functions through simple manipulations to allow the user to input commands through a touch screen of a mobile terminal having a limited screen size are needed.

SUMMARY

Exemplary embodiments provide an apparatus and a method for executing a hot key function of a mobile terminal, capable of performing various hot key functions upon the input of a user's command based on the user's touch and a motion of the mobile terminal.

Exemplary embodiments provide that a specific hot key function is executed if the user touch and the motion of the mobile terminal are detected.

Additional features of the invention will be set forth in the description which follows, and in part will be apparent from the description, or may be learned by practice of the invention.

An exemplary embodiment discloses an apparatus to execute a hot key function of a mobile terminal, the apparatus including a touch detection unit to detect a touch, a motion detection unit to detect a motion of the mobile terminal, and a controller to execute a first hot key function if the touch detection unit detects the touch and the motion detection unit detects the motion of the mobile terminal.

An exemplary embodiment discloses a method for executing a hot key function of a mobile terminal, the method including detecting a touch, detecting a motion of the mobile terminal, executing a first hot key function if the touch of the user is detected and the motion of the mobile terminal is detected to be movement of the mobile terminal.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 8 and FIG. 9 are views showing examples of touch screens before and after a search function has been performed, respectively;

Elements, features, and structures are denoted by the same reference numerals throughout the drawings and the detailed description, and the size and proportions of some elements may be exaggerated in the drawings for clarity and convenience.

DETAILED DESCRIPTION

Figure 1:
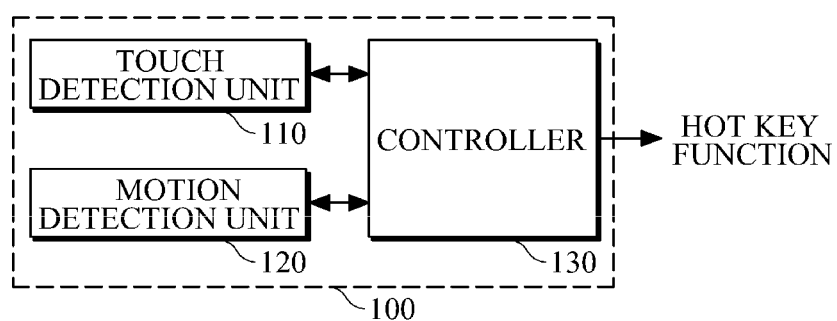
FIG. 1 is a block view showing an apparatus to execute a hot key function of a mobile terminal according to an exemplary embodiment.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block view of an apparatus 100 suitable to execute a hot key function of a mobile terminal according to an exemplary embodiment. The apparatus 100 may include hardware, software, or a combination of hardware and software, and is installed in the mobile terminal to provide the hot key function of the mobile terminal. The apparatus 100 executes the hot key function according to the motion of the mobile terminal and includes a touch detection unit 110, a motion detection unit 120, and a controller 130.

The touch detection unit 110 detects the touch of the user. For instance, the touch detection unit 110 can be realized by densely aligning pressure sensors in the form of a matrix on a touch screen of the mobile terminal. If the user touches a specific part on the touch screen, the pressure sensor aligned on the specific part detects the touch of the user.

The motion detection unit 120 detects the motion of the mobile terminal. For instance, the motion detection unit 120 can be realized by using a gyroscopic sensor to detect the direction and the angle of the mobile terminal in which the apparatus 100 is disposed and an acceleration sensor to detect the speed and the direction of the mobile terminal in which the apparatus 100 is disposed. The motion detection unit 120 detects the motion of the mobile terminal based on signals detected by the gyroscopic sensor and/or the acceleration sensor. Further, the motion detection unit 120 detects if the motion of the mobile terminal is not movement of the mobile terminal, i.e., the mobile terminal is not moved.

If the touch of the user is detected by the touch detection unit 110 and the motion of the mobile terminal is detected by the motion detection unit 120, the controller 130 performs the hot key function according to the motion of the mobile terminal detected by the motion detection unit 120.

The hot key functions performed by the controller may include functions related to data sorting, menu selection, folder management, file management, message management, message editing, mode conversion, and communication. These hot key functions will be described later in more detail.

According to the apparatus 100 to execute the hot key function of the mobile terminal, if the motion of the mobile terminal is detected by the motion detection unit 120 and the touch of the user is detected by the touch detection unit 110, the controller 130 performs a specific hot key function.

Therefore, the user can input commands according to the touch of the user and the motion of the mobile terminal, and the apparatus 100 performs the various hot key functions according to the motion of the mobile terminal and the touch of the user.

According to an exemplary embodiment, the motion detection unit 120 detects a motion direction of the mobile terminal, and the controller 130 performs various hot key functions according to the motion direction detected by the motion detection unit 120. The motion detection unit 120 may detect the motion of the mobile terminal in at least one of upward, downward, leftward, and rightward motion directions.

According to the apparatus 100 to execute the hot key function of the mobile terminal, if the motion of the mobile terminal is detected by the motion detection unit 120 and the touch of the user is detected by the touch detection unit 110, the controller 130 performs various hot key functions according to the motion direction of the mobile terminal detected by the motion detection unit 120.

Therefore, the user can input commands according to the touch of the user and the motion of the mobile terminal, and the apparatus 100 can perform the various hot key functions according to the motion direction of the mobile terminal and the touch of the user.

In addition, according to an exemplary embodiment, if the touch of the user is detected, the controller of the apparatus 100 determines whether a region touched by the user is assigned as a hot key function region.

For instance, the mobile terminal may include default settings such that some objects aligned on a specific region of the touch screen may be set to perform a normal function assigned thereto, and other objects may be set to perform the hot key functions assigned thereto upon the touch of the user and the motion of the mobile terminal.

If the touch detection unit 110 detects the user's touch for the object aligned on a specific region of the touch screen of the mobile terminal, the controller determines whether the touch region is assigned to perform the normal function or the hot key function, i.e., the controller determines whether the region is a normal function region or a hot key function region.

If the touch region is a normal function region, i.e., assigned to perform the normal function, the normal function assigned to the object is performed. In addition, if the touch region is a hot key function region, i.e., assigned to perform the hot key function, the controller 130 determines whether the motion of the mobile terminal is detected by the motion detection unit 120. If the motion of the mobile terminal is detected, the controller 130 performs the specific hot key function.

Hereinafter, description will be made in more detail with regard to the hot key functions of the apparatus 100 to execute the hot key functions of the mobile terminal, such as data sorting, menu selection, folder management, file management, message management, message editing, mode conversion, and communication.

Figure 2:
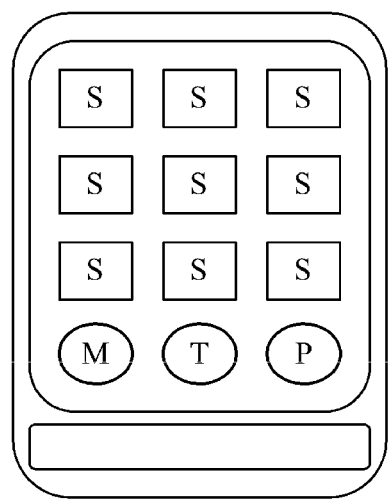
FIG. 2 and FIG. 3 are views showing examples of touch screens before and after an apparatus to execute a hot key function of a mobile terminal performs a hot key function for data sorting.
Figure 3:
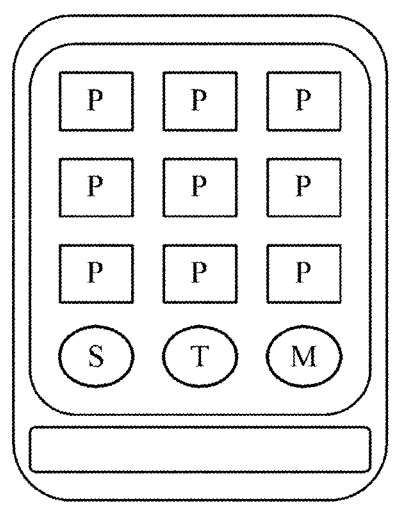

First, a data sorting function of the apparatus to execute the hot key functions of the mobile terminal will be described. FIG. 2 and FIG. 3 are views showing examples before and after the apparatus 100 to execute the hot key function of the mobile terminal performs the hot key function related to data sorting. In FIG. 2 and FIG. 3, "S" represents content related to music, "P" represents content related to still images, "M" represents content related to moving pictures, and "T" represents content related to texts. Although FIG. 2 and FIG. 3 show the content related to music S, the content related to still images P, the content related to moving pictures M, and the content related to texts T, it is understood that aspects are not limited thereto such that more, fewer, and/or other content may be included.

As shown in FIG. 2, the content related to the music S is displayed on the upper part of the touch screen of the mobile terminal, and buttons for selecting the content related to the moving pictures M, the content related to the texts T, and the content related to the still images P are provided on the lower part of the touch screen of the mobile terminal.

If the user touches the button for selecting the content related to the still images P, the touch detection unit 110 of the apparatus 100 detects the touch of the user.

Thus, as shown in FIG. 3, the controller 130 aligns the content related to the still images P to display the content related to the still images P on the touch screen of the mobile terminal.

Therefore, the user can input the command, and the apparatus 100 performs the hot key function related to the data sorting according to the touch of the user and the motion direction of the mobile terminal related to the touch of the user, i.e., the user can touch the button associated with the content related to the still images P and move the mobile terminal in a direction to perform the hot key function related to the data sorting.

In addition, the hot key function related to the data sorting can be performed according to the motion direction of the mobile terminal and the touch of the user. For instance, if the motion detection unit 120 detects that the mobile terminal has moved to the left, the controller 130 displays the content related to the still images P on the touch screen of the mobile terminal in an ascending order according to file names of the content related to the still images P.

Further, if the motion detection unit 120 detects that the mobile terminal has moved to the right, the controller 130 displays the content related to the still images P on the touch screen of the mobile terminal in a descending order according to the file names of the content related to the still images P.

In addition, if the motion detection unit 120 detects that the mobile terminal has moved upward, the controller 130 displays the content related to the still images P on the touch screen of the mobile terminal in an order of time of image capture of the content related to the still images P.

Further, if the motion detection unit 120 detects that the mobile terminal has moved downward, the controller 130 displays the content related to the still images P on the touch screen of the mobile terminal in a reverse order of the time of image capture of the content related to the still images P.

In this manner, the user can input commands by moving the mobile terminal, and the apparatus 100 performs the hot key function related to the data sorting according to the touch of the user and the motion of the mobile terminal.

Figure 4:
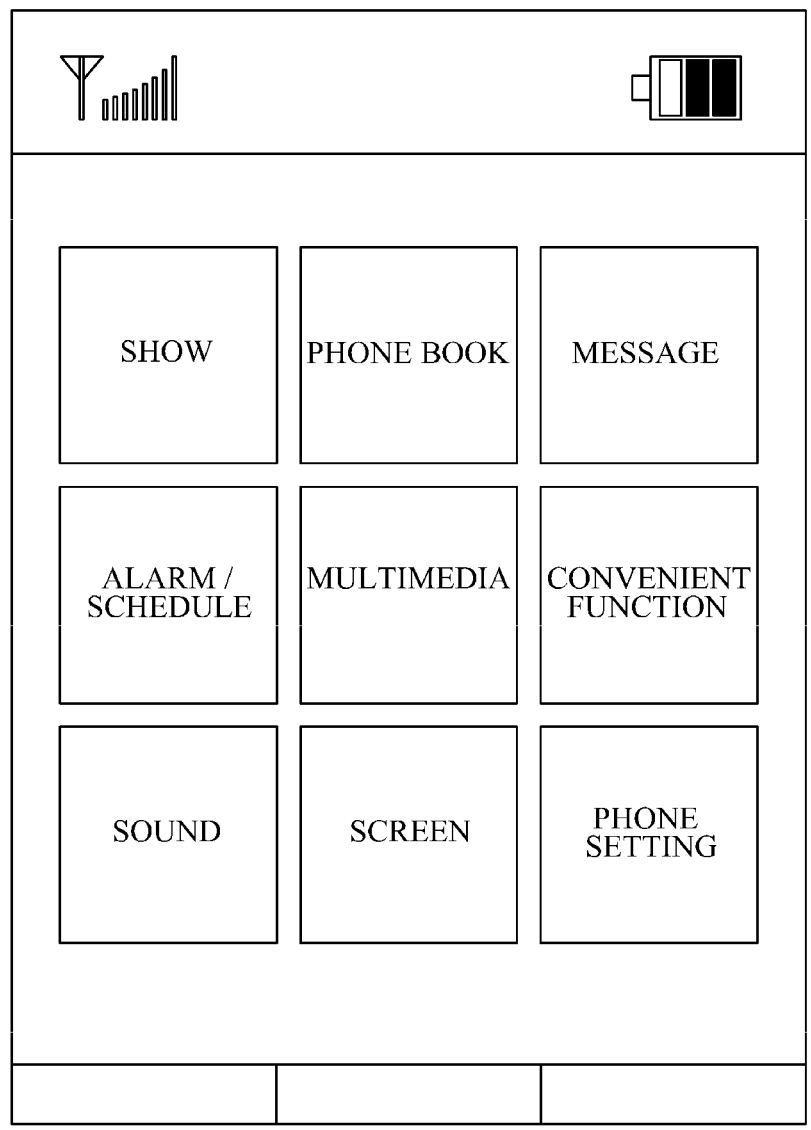
FIG. 4 is a view showing various menus displayed on a touch screen of a mobile terminal.

Hereinafter, the menu selection function of the apparatus to execute the hot key functions of the mobile terminal according to an exemplary embodiment will be described. FIG. 4 is a view showing various menus displayed on a touch screen of a mobile terminal. FIG. 4 shows various menus including "show", "phone book", "message", "alarm/schedule", "multimedia", "convenient function", "sound", "screen", and "phone setting", but it is understood that aspects are not limited thereto such that more, fewer, and/or other menus may be included.

As shown in FIG. 4, if the user touches a specific menu among the menus displayed on the touch screen of the mobile terminal, the touch detection unit 110 of the apparatus 100 detects the touch of the user. The touch may be determined to be in a normal function region or a hot key function region.

If the user moves the mobile terminal and the touch of the user is detected by the touch detection unit 110 of the apparatus 100, the motion detection unit 120 detects the motion of the mobile terminal, so that the controller 130 displays the specific menu on the touch screen.

In this manner, the user can input commands by moving the mobile terminal, and the apparatus 100 performs the hot key function related to the menu selection according to the touch of the user and the motion of the mobile terminal.

In addition, the hot key function related to the menu selection can be performed according to the motion direction of the mobile terminal and the touch of the user. For instance, if the motion detection unit 120 detects that the mobile terminal has moved to the left, the controller 130 displays a lower menu of the specific menu touched by the user.

Further, if the motion detection unit 120 detects that the mobile terminal has moved to the right, the controller 130 displays an upper menu of the specific menu touched by the user.

In addition, if the motion detection unit 120 detects that the mobile terminal has moved upward, the controller 130 displays an uppermost menu of the specific menu touched by the user.

Further, if the motion detection unit 120 detects that the mobile terminal has moved downward, the controller 130 displays a lowest menu of the specific menu touched by the user.

In this manner, the user can input commands by moving the mobile terminal, and the apparatus 100 performs the hot key function related to the menu selection according to the touch of the user and the motion of the mobile terminal.

Hereinafter, a folder management function of the apparatus to execute the hot key functions of the mobile terminal according to an exemplary embodiment will be described. Although not shown in the drawings, if the user touches a specific folder among various folders displayed on the touch screen of the mobile terminal, the touch detection unit 110 of the apparatus 100 detects the touch of the user.

If the user moves the mobile terminal and the touch of the user is detected by the touch detection unit 110 of the apparatus 100, the motion detection unit 120 detects the motion of the mobile terminal, so that the controller 130 manages the specific folder.

In this manner, the user can input the command by moving the mobile terminal and the apparatus 100 performs the hot key function related to the folder management according to the touch of the user and the motion of the mobile terminal.

In addition, the hot key function related to the folder management can be performed according to the motion direction of the mobile terminal and the touch of the user. For instance, if the motion detection unit 120 detects that the mobile terminal has moved to the left, the controller 130 deletes the specific folder touched by the user.

Further, if the motion detection unit 120 detects that the mobile terminal has moved to the right, the controller 130 creates a subfolder of the specific folder.

In addition, if the motion detection unit 120 detects that the mobile terminal has moved upward, the controller 130 copies the specific folder to another folder.

Further, if the motion detection unit 120 detects that the mobile terminal has moved downward, the controller 130 moves the specific folder to another folder.

In this manner, the user can input commands by moving the mobile terminal, and the apparatus 100 performs the hot key function related to the folder management according to the touch of the user and the motion of the mobile terminal.

Hereinafter, the file management function of the apparatus to execute the hot key functions of the mobile terminal according to an exemplary embodiment will be described. Although not shown in the drawings, if the user touches a specific file from among various files displayed on the touch screen of the mobile terminal, the touch detection unit 110 of the apparatus 100 detects the touch of the user.

If the user moves the mobile terminal, the motion detection unit 120 detects the motion of the mobile terminal, so that the controller 130 manages the specific file.

In this manner, the user can input commands by moving the mobile terminal, and the apparatus 100 performs the hot key function related to the file management according to the touch of the user and the motion of the mobile terminal.

In addition, the hot key function related to the file management can be performed according to the motion direction of the mobile terminal and the touch of the user. For instance, if the motion detection unit 120 detects that the mobile terminal has moved to the left, the controller 130 deletes the specific file touched by the user.

Further, if the motion detection unit 120 detects that the mobile terminal has moved to the right, the controller 130 changes a file name of the specific file.

In addition, if the motion detection unit 120 detects that the mobile terminal has moved upward, the controller 130 copies the specific file to another file.

Further, if the motion detection unit 120 detects that the mobile terminal has moved downward, the controller 130 moves the specific file to another file.

In this manner, the user can input commands by moving the mobile terminal, and the apparatus 100 performs the hot key function related to the file management according to the touch of the user and the motion of the mobile terminal.

Hereinafter, the message management function of the apparatus to execute the hot key functions of the mobile terminal will be described. If the user touches the message menu among the various menus displayed on the touch screen of the mobile terminal as shown in FIG. 4, the touch detection unit 110 of the apparatus 100 detects the touch of the user.

Figure 5:
FIG. 5 is a view showing content of a received message box in a message menu.

If the user moves the mobile terminal and the touch of the message menu as shown in FIG. 4 is detected by the touch detection unit 110 of the apparatus 100, the motion detection unit 120 detects the motion of the mobile terminal, so that the controller 130 performs the message management function, i.e., the controller 130 displays the content of a received message box as shown in FIG. 5. FIG. 5 is a view showing the content of the received message box in the message menu.

In this manner, the user can input commands by moving the mobile terminal, and the apparatus 100 performs the hot key function related to the message management according to the touch of the user and the motion of the mobile terminal.

In addition, the hot key function related to the message management can be performed according to the motion direction of the mobile terminal and the touch of the user. For instance, if the motion detection unit 120 detects that the mobile terminal has moved to the left, the controller 130 displays the content of the received message box in the message menu.

Further, if the motion detection unit 120 detects that the mobile terminal has moved to the right, the controller 130 displays the content of the transmitted message box in the message menu.

In addition, if the motion detection unit 120 detects that the mobile terminal has moved upward, the controller 130 executes a message writing function in the message menu such that the user can edit and transmit a message.

Further, if the motion detection unit 120 detects that the mobile terminal has moved downward, the controller 130 executes an emoticon transmission function in the message menu such that the user can edit and transmit an emoticon.

In this manner, the user can input commands by moving the mobile terminal, and the apparatus 100 performs the hot key function related to the message management according to the touch of the user and the motion of the mobile terminal.

Figure 6:
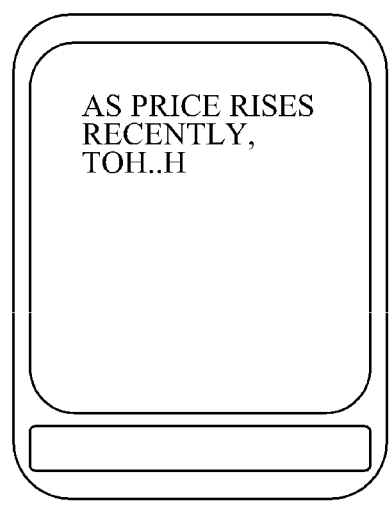
FIG. 6 and FIG. 7 are views showing examples of touch screens before and after a message has been edited, respectively.
Figure 7:
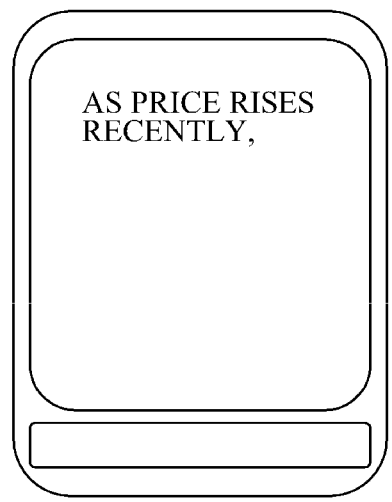

Hereinafter, a message editing function of the apparatus to execute the hot key functions of the mobile terminal will be described. FIG. 6 and FIG. 7 are views showing examples of touch screens before and after the message has been edited, respectively.

If the user touches a specific part of the touch screen where a message is written while writing the message on the touch screen of the mobile terminal, the touch detection unit 110 of the apparatus 100 detects the touch of the user.

If the user moves the mobile terminal and the touch of the specific part of the touch screen is detected by the touch detection unit 110 of the apparatus 100, the motion detection unit 120 detects the motion of the mobile terminal, so that the controller 130 performs the message editing function, i.e., the controller 130 deletes the message from the specific part of the message touched by the user.

In this manner, the user can input the command by moving the mobile terminal, and the apparatus 100 performs the hot key function related to the message editing according to the touch of the user and the motion of the mobile terminal.

In addition, the hot key function related to the message editing can be performed according to the motion direction of the mobile terminal and the touch of the user. For instance, if the motion detection unit 120 detects that the mobile terminal has moved to the left, the controller 130 deletes the message from the specific part of the message touched by the user.

Further, if the motion detection unit 120 detects that the mobile terminal has moved to the right, the controller 130 deletes the specific part of the message touched by the user. For example, as shown in FIG. 6 and FIG. 7, the specific part of the message "TOH . . . H" is deleted.

In addition, if the motion detection unit 120 detects that the mobile terminal has moved upward, the controller 130 inserts a blank to the specific part of the message touched by the user.

Further, if the motion detection unit 120 detects that the mobile terminal has moved downward, the controller 130 backspaces from a current writing position to a previous writing position.

In this manner, the user can input commands by moving the mobile terminal, and the apparatus 100 performs the hot key function related to the message editing according to the touch of the user and the motion of the mobile terminal.

Hereinafter, a mode conversion function of the apparatus to execute the hot key functions of the mobile terminal will be described. Although not shown in the drawings, if the user touches a specific part of the touch screen where a message is written while writing the message on the touch screen of the mobile terminal, the touch detection unit 110 of the apparatus 100 detects the touch of the user.

If the user moves the mobile terminal and the touch of the specific part is detected by the touch detection unit 110 of the apparatus 100, the motion detection unit 120 detects the motion of the mobile terminal, so that the controller 130 performs the mode conversion function, such as a Korean/English conversion, a number key input mode, a special character input mode, and a capital/small letter conversion.

In this manner, the user can input commands by moving the mobile terminal, and the apparatus 100 performs the hot key function related to the mode conversion according to the touch of the user and the motion of the mobile terminal.

In addition, the hot key function related to the mode conversion can be performed according to the motion direction of the mobile terminal and the touch of the user. For instance, if the motion detection unit 120 detects that the mobile terminal has moved to the left, the controller 130 converts from a Korean mode into an English mode or vice versa.

Further, if the motion detection unit 120 detects that the mobile terminal has moved to the right, the controller 130 enters the number key input mode.

In addition, if the motion detection unit 120 detects that the mobile terminal has moved upward, the controller 130 enters the special character input mode.

Further, if the motion detection unit 120 detects that the mobile terminal has moved downward, the controller 130 converts from a capital letter input mode into a small letter input mode or vice versa.

In this manner, the user can input commands by moving the mobile terminal, and the apparatus 100 performs the hot key function related to the mode conversion according to the touch of the user and the motion of the mobile terminal.

Figure 8:

Hereinafter, a search function of the apparatus to execute the hot key functions of the mobile terminal will be described. FIG. 8 and FIG. 9 are views showing examples of touch screens before and after the search function has been performed, respectively.

For instance, if the user touches an item related to specific music content among various items displayed on the touch screen of the mobile terminal, the touch detection unit 110 of the apparatus 100 detects the touch of the user.

If the user moves the mobile terminal, the motion detection unit 120 detects the motion of the mobile terminal, and if a touch of the specific music content is detected by the touch detection unit 110 of the apparatus 100, the controller 130 performs the search function. That is, as shown in FIG. 9, the controller 130 searches the music content related to a singer of the specific music content touched by the user in FIG. 8.

In this manner, the user can input commands by moving the mobile terminal, and the apparatus 100 performs the hot key function related to the search according to the touch of the user and the motion of the mobile terminal.

In addition, the hot key function related to the search can be performed according to the motion direction of the mobile terminal and the touch of the user. For instance, if the motion detection unit 120 detects that the mobile terminal has moved to the left, the controller 130 searches for and displays music content related to the singer of the specific music content touched by the user.

Further, if the motion detection unit 120 detects that the mobile terminal has moved to the right, the controller 130 searches for and displays music content having a same genre as that of the specific music content touched by the user.

In addition, if the motion detection unit 120 detects that the mobile terminal has moved upward, the controller 130 searches for and displays music content of an album with which the specific music content touched by the user is associated.

Further, if the motion detection unit 120 detects that the mobile terminal has moved downward, the controller 130 searches for and displays music content similar to the specific music content touched by the user.

In this manner, the user can input commands by moving the mobile terminal, and the apparatus 100 performs the hot key function related to the search according to the touch of the user and the motion of the mobile terminal.

Hereinafter, a communication function of the apparatus to execute the hot key functions of the mobile terminal will be described. Although not shown in the drawings, if the user touches a specific phone number from a phone number list registered in a phone book provided on the touch screen of the mobile terminal, the touch detection unit 110 of the apparatus 100 detects the touch of the user.

If the user moves the mobile terminal and the touch of the specific phone number is detected, the motion detection unit 120 detects the motion of the mobile terminal, so that the controller 130 performs the communication function.

In this manner, the user can input commands by moving the mobile terminal, and the apparatus 100 performs the hot key function related to the communication according to the touch of the user and the motion of the mobile terminal.

In addition, the hot key function related to a call connecting can be performed according to the motion direction of the mobile terminal of the user. For instance, if the motion detection unit 120 detects that the mobile terminal has moved to the left, the controller 130 attempts to make a voice communication with the specific phone number touched by the user.

Further, if the motion detection unit 120 detects that the mobile terminal has moved to the right, the controller 130 attempts to make a video communication with the specific phone number touched by the user.

In addition, if the motion detection unit 120 detects that the mobile terminal has moved upward, the controller 130 sends a short message to the specific phone number touched by the user.

Further, if the motion detection unit 120 detects that the mobile terminal has moved downward, the controller 130 sends a multimedia message to the specific phone number touched by the user.

In this manner, the user can input commands by moving the mobile terminal, and the apparatus 100 performs the hot key function related to the call connecting according to the touch of the user and the motion of the mobile terminal.

In addition to the above call connecting scheme, the hot key function can be performed in relation to an incoming call. If the incoming call is received in the mobile terminal, the phone number of the transmitter is displayed on the touch screen of the mobile terminal. If the user touches the phone number of the transmitter displayed on the touch screen, the touch detection unit 110 of the apparatus 100 detects the touch of the user.

If the user moves the mobile terminal and the touch of the phone number of the transmitter displayed on the touch screen is detected by the touch detection unit 110 of the apparatus 100, the motion detection unit 120 detects the motion of the mobile terminal, so that the controller 130 performs the hot key function related to the communication.

In this manner, the user can input commands by moving the mobile terminal, and the apparatus 100 performs the hot key function related to the incoming call according to the touch of the user and the motion of the mobile terminal.

Meanwhile, the hot key function related to the incoming call can be performed according to the motion direction of the mobile terminal and the touch of the user. For instance, if the motion detection unit 120 detects that the mobile terminal has moved to the left, the controller 130 receives the incoming call.

Further, if the motion detection unit 120 detects that the mobile terminal has moved to the right, the controller 130 rejects the incoming call.

In this manner, the user can input commands by moving the mobile terminal, and the apparatus 100 performs the hot key function related to the incoming call according to the touch of the user and the motion of the mobile terminal.

Figure 10:
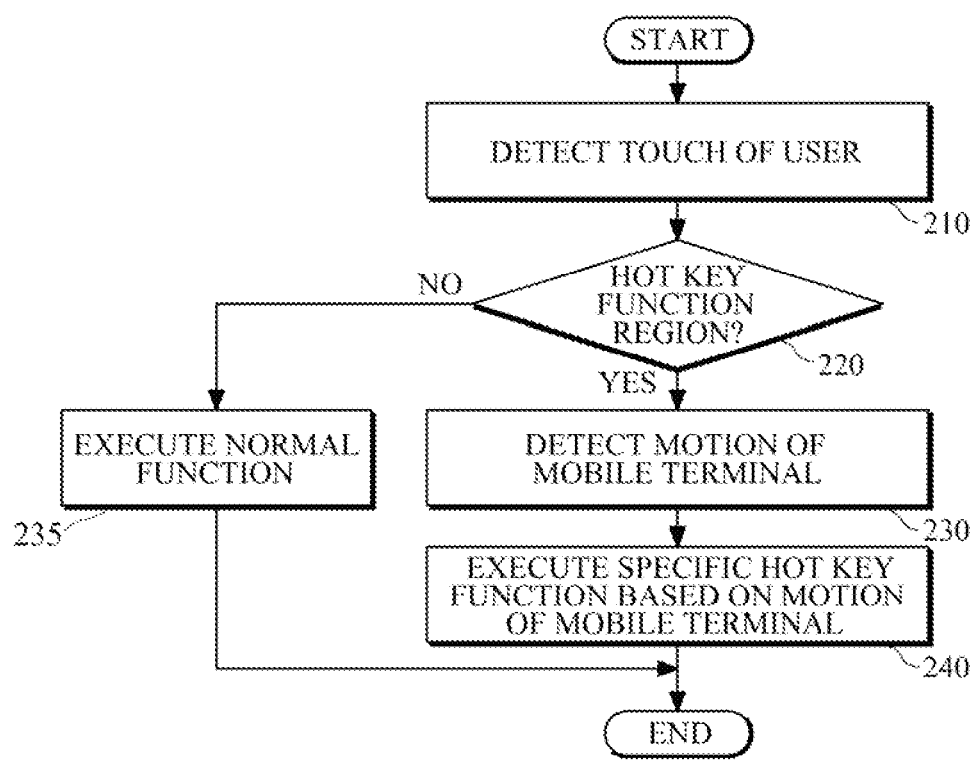
FIG. 10 is a flowchart showing a method for executing a hot key function of a mobile terminal.

Hereinafter, the method for executing the hot key function of the mobile terminal according to an exemplary embodiment will be described with reference to FIG. 10 and FIG. 11. FIG. 10 is a flowchart showing a method for executing the hot key function of the mobile terminal according to an embodiment of the present invention.

As shown in FIG. 10, the apparatus detects the touch of the user in operation 210. If the touch of the user is detected in operation 210, it is determined whether the region touched by the user is assigned as a hot key function region in operation 220.

If the region touched by the user is assigned as a normal function region, i.e., not a hot key function region, a normal function is executed in operation 235. In contrast, if the region touched by the user is assigned as the hot key function region, the motion of the mobile terminal is detected in operation 230.

If motion of the mobile terminal is detected in operation 230, the hot key function of the mobile terminal is executed in operation 240. For instance, the hot key function of the mobile terminal executed in operation 240 may include data sorting, menu selection, folder management, file management, message management, message editing, mode conversion, and communication. If motion of the mobile terminal is determined to be no motion in operation 230, i.e., the mobile terminal is not moved, the normal function may be executed in operation 235.

Therefore, if the motion of the mobile terminal is detected and the touch of the user is detected, the specific hot key function is executed. Thus, the user can input commands by moving the mobile terminal, and the apparatus 100 executes various hot key functions according to the motion of the mobile terminal and the touch of the user.

Figure 11:
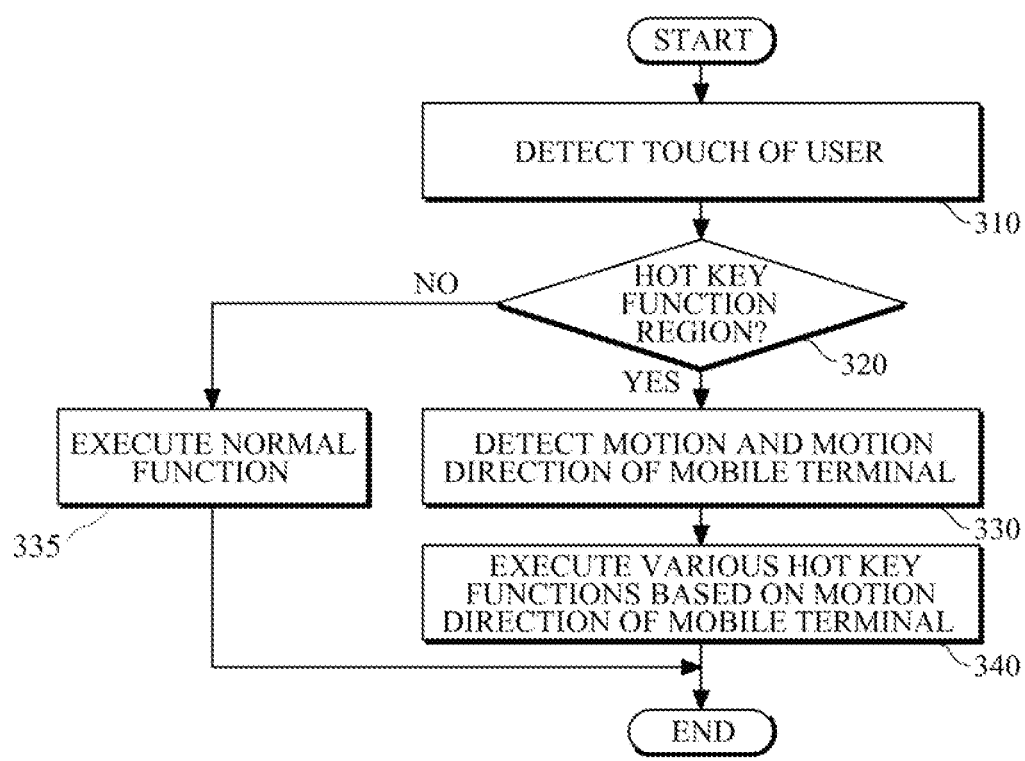
FIG. 11 is a flowchart showing a method for executing a hot key function of a mobile terminal.

FIG. 11 is a flowchart showing a method for executing the hot key function of the mobile terminal according to another embodiment of the present invention. As shown in FIG. 11, the apparatus detects the touch of the user in operation 310. If the touch of the user is detected in operation 310, it is determined whether the region touched by the user is assigned as the hot key function region in operation 320.

If the region touched by the user is assigned as a normal function region, the normal function is executed in operation 335. In contrast, if the region touched by the user is assigned as a hot key function region, the motion and the motion direction of the mobile terminal are detected in operation 330.

In operation 330, the apparatus may detect the motion of the mobile terminal in at least one of the left, right, upward, and downward directions. If the motion of the mobile terminal is detected in operation 330, the hot key function of the mobile terminal is executed according to the motion direction of the mobile terminal in operation 340. For instance, the hot key function of the mobile terminal executed in operation 340 may include data sorting, menu selection, folder management, file management, message management, message editing, mode conversion, and communication. If motion of the mobile terminal is determined to be no motion in operation 330, i.e., the mobile terminal is not moved, the normal function may be executed in operation 335.

Therefore, if the motion of the mobile terminal is detected and the touch of the user is detected, the hot key function is executed according to the motion direction of the mobile terminal. Thus, the user can input commands by moving the mobile terminal, and the apparatus 100 executes various hot key functions according to the motion direction of the mobile terminal and the touch of the user.

Although specific functions are described above as being associated with specific directions or as being associated with no direction, aspects are not limited thereto such that the specific functions or other functions may be associated with other, different, multiple, or sequential directions. Further, a touch of the user may be detected before, during, or after a motion of the mobile terminal and/or a motion direction of the mobile terminal are detected.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus to execute a hot key function of a mobile terminal, the apparatus comprising:
   a touch detection unit to detect a touch on an item associated with a hot key function;
   a motion detection unit to detect a motion direction of the mobile terminal; and
   a controller configured to execute the hot key function if the touch detection unit detects the touch and the motion detection unit detects the motion direction of the mobile terminal,
   wherein the hot key function comprises at least one of a data sorting function, a file data management function, a message management function, and a mode conversion function, and
   wherein the controller is configured to convert an input mode of an input interface to a first input mode corresponding to a first motion direction if the hot key function corresponds to the mode conversion function and the motion direction of the mobile terminal corresponds to the first motion direction, and to convert an input mode of the input interface to a second input mode corresponding to a second motion direction if the hot key function corresponds to the mode conversion function and the motion direction of the mobile terminal corresponds to the second motion direction.

2. The apparatus of claim 1, wherein the controller determines whether a region receiving the touch is assigned as a region for a hot key function type among the data sorting function, the file data management function, the message management function, and the mode conversion function.

3. The apparatus of claim 1, wherein a sorting order of the data sorting function is determined according to the motion direction of the mobile terminal if the hot key function corresponds to the data sorting function.

4. The apparatus of claim 1, wherein the hot key function further comprises a menu selection function.

5. The apparatus of claim 1, wherein the controller is configured to perform at least one operation among deleting a file or folder, creating a subfolder, copying a file or folder, relocating a file or folder, and changing a file name according to the motion direction of the mobile terminal if the hot key function corresponds to the file data management function.

6. The apparatus of claim 1, wherein the controller is configured to perform at least one operation among displaying a received message box, displaying a transmitted message box, displaying a message creating screen, and displaying an emoticon editing screen according to the motion direction of the mobile terminal if the hot key function corresponds to the message management function.

7. The apparatus of claim 1, wherein the controller is configured to perform at least one operation among deleting a portion corresponding to the item, inserting a blank to a portion corresponding to item, backspacing from a portion corresponding to the item according to the motion direction of the mobile terminal if the hot key function corresponds to the message management function.

8. The apparatus of claim 1, wherein the controller is configured to perform at least one operation among converting a mode for text input language, converting to a mode for number key input, converting to a mode for special character input, and converting a mode for a capital/small letter input according to the motion direction of the mobile terminal if the hot key function corresponds to the mode conversion function.

9. The apparatus of claim 1, wherein the hot key function further comprises a searching function, and
   the controller is configured to execute the searching function in association with the item according to a search criterion corresponding to the motion direction.

10. The apparatus of claim 1, wherein the hot key function further comprises a communication function.

11. The apparatus of claim 1, wherein the motion direction is one of upward, downward, leftward, and rightward, and the controller respectively executes the first hot key function, a second hot key function, a third hot key function, or a hot key function according to the detected upward, downward, leftward, and rightward motion directions of the mobile terminal, respectively.

12. The apparatus of claim 1, wherein the controller executes a normal function if the region receiving the touch is not a hot key function region.

13. The apparatus of claim 1, wherein, if the motion direction is a first direction, the controller executes the first hot key function, and, if the motion direction is a second direction, the controller executes a second hot key function.

14. A method for executing a hot key function of a mobile terminal, the method comprising:
   detecting a touch on an item associated with a hot key function;
   detecting a motion direction of the mobile terminal;
   executing, by a controller of the mobile terminal, the hot key function if the touch is detected and the motion direction of the mobile terminal is detected,
   wherein the hot key function comprises at least one of a data sorting function, a file data management function, a message management function, and a mode conversion function, and
   wherein the controller is configured to convert an input mode of an input interface to a first input mode corresponding to a first motion direction if the hot key function corresponds to the mode conversion function and the motion direction of the mobile terminal corresponds to the first motion direction, and to convert an input mode of the input interface to a second input mode corresponding to a second motion direction if the hot key function corresponds to the mode conversion function and the motion direction of the mobile terminal corresponds to the second motion direction.

15. The method of claim 14, further comprising:
determining whether a region receiving the touch is assigned as a region for a hot key function type among the data sorting function, the file data management function, the message management function, and the mode conversion function.

16. The method of claim 14, further comprising:
executing one of a first hot key function, a second hot key function, a third hot key function, or a fourth hot key function if the motion direction is detected as one of an upward, a downward, a leftward, and a rightward motion direction, respectively.

17. The method of claim 14, wherein the controller is configured to perform at least one operation among deleting a file or folder, creating a subfolder, copying a file or folder, relocating a file or folder, and changing a file name according to the motion direction of the mobile terminal if the hot key function corresponds to the file data management function.

18. The method of claim 14, wherein a sorting order of the data sorting function is determined according to the motion direction of the mobile terminal if the hot key function corresponds to the data sorting function.

19. The method of claim 14, wherein the controller is configured to perform at least one operation among displaying a received message box, displaying a transmitted message box, displaying a message creating screen, and displaying an emoticon editing screen according to the motion direction of the mobile terminal if the hot key function corresponds to the message management function.

20. The method of claim 14, wherein the controller is configured to perform at least one operation among deleting a portion corresponding to the item, inserting a blank to a portion corresponding to item, backspacing from a portion corresponding to the item according to the motion direction of the mobile terminal if the hot key function corresponds to the message management function.

21. The method of claim 14, wherein the controller is configured to perform at least one operation among converting a mode for text input language, converting to a mode for number key input, converting to a mode for special character input, and converting a mode for a capital/small letter input according to the motion direction of the mobile terminal if the hot key function corresponds to the mode conversion function.

22. A method for executing a hot key function of a mobile terminal, the method comprising:
detecting a touch on an item associated with the hot key function;
detecting a motion direction of the mobile terminal;
executing, by a controller of the mobile terminal, the hot key function if the touch is detected and the motion direction of the mobile terminal is detected,
wherein the controller is configured to execute a first searching function in association with the item according to a first search criterion if the motion direction corresponds to a first direction, and to execute a second searching function in association with the item according to a second search criterion if the motion direction corresponds to a second direction.

23. The method of claim 22, wherein the first searching function is performed in association with a first element of the item, and the second searching function is performed in association with a second element of the item.

\* \* \* \* \*